United States Patent
Adra

(10) Patent No.: US 7,675,412 B2
(45) Date of Patent: Mar. 9, 2010

(54) SYSTEM AND METHOD FOR DYNAMICALLY TRACKING AND STATE FORECASTING TAGGED ENTITIES

(76) Inventor: Hosni I. Adra, 1532 Placer Ct., Naperville, IL (US) 60565

(*) Notice: Subject to any disclaimer, the term of this patent is extended or adjusted under 35 U.S.C. 154(b) by 216 days.

(21) Appl. No.: 11/679,514

(22) Filed: Feb. 27, 2007

(65) Prior Publication Data

US 2007/0203768 A1  Aug. 30, 2007

Related U.S. Application Data

(60) Provisional application No. 60/776,971, filed on Feb. 27, 2006.

(51) Int. Cl.
*G08B 1/08* (2006.01)

(52) U.S. Cl. .............. 340/539.13; 340/572.1; 340/10.1; 340/5.1; 340/522; 235/375; 235/376

(58) Field of Classification Search .............. 340/572.1, 340/539.13, 539.21, 539.23, 825.36, 825.49, 340/573.1, 573.4, 10.1, 5.1, 522; 705/7; 235/376, 382, 384, 451, 375
See application file for complete search history.

(56) References Cited

U.S. PATENT DOCUMENTS

| | | | | |
|---|---|---|---|---|
| 5,543,797 | A * | 8/1996 | Hochstein et al. | 340/10.2 |
| 5,594,786 | A * | 1/1997 | Chaco et al. | 379/93.09 |
| 6,339,709 | B1 * | 1/2002 | Gladwin et al. | 455/115.1 |
| 7,064,660 | B2 * | 6/2006 | Perkins et al. | 340/539.13 |
| 7,091,852 | B2 * | 8/2006 | Mason et al. | 340/539.13 |
| 7,323,991 | B1 * | 1/2008 | Eckert et al. | 340/572.1 |
| 2004/0021569 | A1 * | 2/2004 | Lepkofker et al. | 340/568.1 |
| 2004/0145472 | A1 * | 7/2004 | Schmidtberg et al. | 340/539.27 |
| 2005/0027604 | A1 * | 2/2005 | Bandy et al. | 705/22 |
| 2005/0035862 | A1 * | 2/2005 | Wildman et al. | 340/573.1 |
| 2005/0246094 | A1 * | 11/2005 | Moscatiello | 701/207 |
| 2005/0252970 | A1 * | 11/2005 | Howarth et al. | 235/451 |
| 2006/0055552 | A1 * | 3/2006 | Chung et al. | 340/686.1 |
| 2006/0055564 | A1 * | 3/2006 | Olsen et al. | 340/994 |
| 2006/0103534 | A1 * | 5/2006 | Arms et al. | 340/572.1 |
| 2007/0078531 | A1 * | 4/2007 | Adra | 700/31 |

* cited by examiner

*Primary Examiner*—Davetta W Goins
*Assistant Examiner*—Hoi C Lau
(74) *Attorney, Agent, or Firm*—Kader S. Gacem; Neal, Gerber & Eisenberg LLP

(57) ABSTRACT

A method is provided for dynamically tracking a plurality of entities progressing through an operation each having an electronic tagging device associated therewith. The method includes sensing signals emitted by each of the plurality of tagging devices, at predetermined instances or when triggered by external events, by a plurality of sensors located at predetermined sites with respect to the operation, each signal including information uniquely identifying the corresponding tagging device, communicating the sensed signals and corresponding energy levels at which they were sensed by each of the plurality of sensors to a data processor, processing the unique identification information provided by the signals and their energy levels to determine a location of each tagging device relatively to the predetermined sites of the sensors, and dynamically updating a path of each tagging device and the associated entity based on the determined location with respect to at least a portion of a displayed map of the operation.

16 Claims, 2 Drawing Sheets

SYSTEM AND METHOD FOR DYNAMICALLY TRACKING AND STATE FORECASTING TAGGED ENTITIES

RELATED APPLICATIONS

The present patent application claims benefit to a provisional patent application No. 60/776,971, filed on Feb. 27, 2006, the entire contents of which being incorporated herein by reference.

FIELD

The present embodiments relate, in general, to systems incorporating tracking and/or positioning devices for tracking entities and, more particularly, to a system and method for dynamically tracking and state forecasting entities.

BACKGROUND

During vehicle transportation/movements routinely experienced in dealership environments, vehicular entities are typically subjected to or involved in unpredictable and location altering movements due to activities engaging associated personnel and/or clients. Similarly, in warehouse environments, various entities, such as containers, are often moved between a starting location and a future location, with some uncertainty arising regarding the path taken between these two locations and the future location. As more users, personnel employees or clients are involved in the movements of these mobile or movable entities, the likelihood of a movable entity being misplaced or removed from the corresponding environment increases. So, typical issues relating to on-demand locating of these movable entities increase with the size of the environment and/or the number of movable entities involved.

These environments have typically used inefficient tools or approaches for tracking these movable entities, such as barcoded labels and/or magnetic stripe tags and documents such as bills of lading and manifests and/or paper labels, which have lead to wasteful management assets and increase in overall operation costs. These tracking approaches typically do not track substantially continuously these movable entities along paths of a process or operation without human intervention. Moreover, these tracking approaches require bringing or providing suitable readers to these bar-coded labeled or magnetically tagged entities to ensure logging of the proper locations of these entities.

Electronic tracking and/or positioning devices or tags are utilized to overcome these cumbersome disadvantages associated with these conventional tracking approaches. These tags may use either radio frequency identification (RFID) or global positioning system (GPS) technologies. Applications of RFID technology are wide ranging and involve detection of tagged entities as they pass or are stationed near a RFID sensor or reader via unique identification of specific tags associated with these entities, and storing data relating to the tags into the RFID reader or alternate data storage for later recovery. Applications of GPS technology involve determining a position of a GPS receiver or entity by measuring the distance between itself and three or more GPS satellites. Measuring the time delay between transmission and reception of each GPS radio signal gives the distance to each GPS satellite, since the signal travels at a known speed. The signals also carry information about the satellites' location. By determining the position of, and distance to, at least three satellites, the receiver can compute its position using trilateration or triangulation. Receivers typically do not have perfectly accurate clocks and therefore track one or more additional satellites to correct the receiver's clock error.

These RFID and GPS electronic tracking technologies can be useful tools in well-known techniques of productivity improvements of process or operations. With today's emphasis on "lean implementation" in business environments, manufacturing and service, companies seek to acquire tools that effectively identify problems affecting productivity and update work-in-progress operation flows with newly inserted tasks. A basic philosophy of the lean implementation into an operation flow is to target inefficiency and to improve economical goals, which is accomplished by focusing on determining production times that meet or exceed customer requirements. Initiatives of lean implementations typically begin with a development of a value stream map of an operation. However, the value stream map does not take into consideration a dynamic aspect of the operation and a product mix that may be in production at different times.

Six Sigma is a method, based on standard deviations, used to analyze and identify variations in operation flows to provide productivity improvements. As such, some companies have integrated aspects of the six-sigma and lean tools to improve productivity in the manufacturing and service environments. However, when process or operation map studies and forecasting simulations are required due to changes in operation constraints, further off-line actions have to be undertaken such as building, verifying and validating simulation models for experimentation of improvements. These actions thus lack a dynamic aspect of integrations or modifications in model simulations.

Accordingly, a system and method is desired that can integrate and combine electronic tracking technologies with varied analytical and implementation tools to dynamically track entities involved in operations so as to simulate and analyze these operations while subjected to any applicable conditions and scenarios to provide productivity improvements.

BRIEF SUMMARY

The present invention is defined by the appended claims. This description summarizes some aspects of the present embodiments and should not be used to limit the claims.

A method is provided for dynamically tracking a plurality of entities progressing through an operation each having an electronic tagging device associated therewith. The method includes sensing signals emitted by each of the plurality of tagging devices, at predetermined instances or when triggered by external events, by a plurality of sensors located at predetermined sites with respect to the operation, each signal including information uniquely identifying the corresponding tagging device, communicating the sensed signals and corresponding energy levels at which they were sensed by each of the plurality of sensors to a data processor, processing the unique identification information provided by the signals and their energy levels to determine a location of each tagging device relatively to the predetermined sites of the sensors, and dynamically updating a path of each tagging device and the associated entity based on the determined location with respect to at least a portion of a displayed map of the operation.

In one aspect, the method for dynamically tracking a plurality of entities determines that a subset of the plurality of entities is correlated to one another when their respective locations remain in proximity during a segment of time of the operation.

In another aspect, the method for dynamically tracking a plurality of entities determines that one of the plurality of entities is progressing through the operation within the physical dimensions of another one of the plurality of entities when a distance between the tracked locations of these two entities remains smaller than one of the physical dimensions of the another one of the plurality of the entities.

Figure 1:
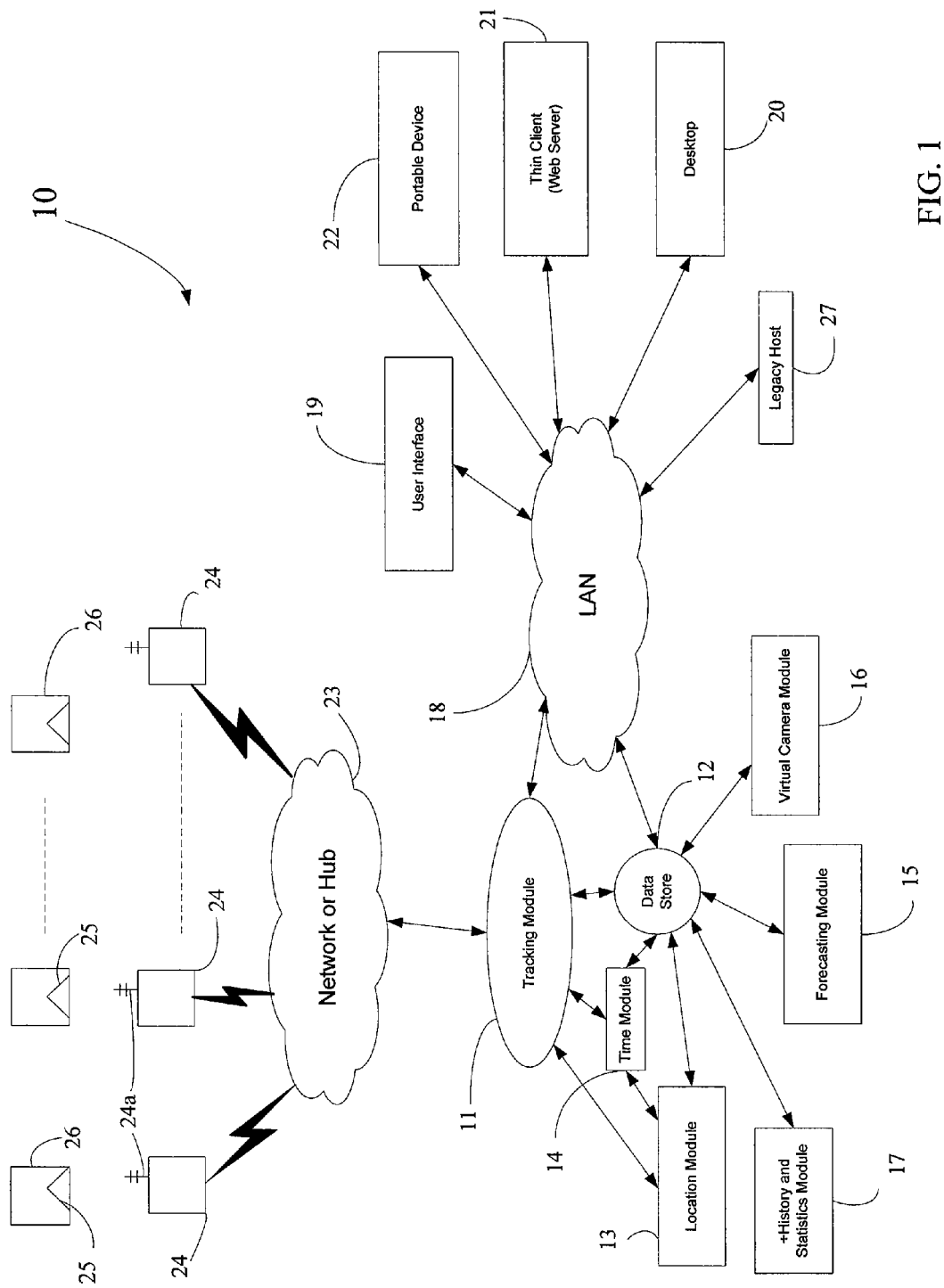
FIG. 1 illustrates a functional diagram of a tracking system for tagged entities of an operation in accordance with the invention.

Illustrative and exemplary embodiments of the invention are described in further detail below with reference to and in conjunction with the figures.

DETAILED DESCRIPTION OF THE DRAWINGS

The present invention is defined by the appended claims. This description summarizes some aspects of the present embodiments and should not be used to limit the claims.

While the present invention may be embodied in various forms, there is shown in the drawings and will hereinafter be described some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a and an" object is intended to denote also one of a possible plurality of such objects.

Turning now to the drawings, and particularly to FIG. 1, a functional diagram 100 illustrates a tracking, monitoring, forecasting, and analysis system 10 embodying the principles of the present invention. For the sake of simplicity, hereafter, the tracking, monitoring, forecasting and analysis system 10 will be referred to as the tracking system 10, and a discussion of tags and tracked entities will be limited to the RFID technology. A similar discussion can be applied to the GPS technology or any other technology enabling the tracking of entities processed by or involved in an operation.

In the tracking system 10, a tracking and mapping module 11 communicates data to with a data store 12, a location module 13, a time module 14, a forecasting module 15, a virtual camera 16 and a history and statistical analysis module 17. Alternately, the tracking/mapping module 11 and the location module 13 may be combined into one tracking and locating module. These modules and others to be introduced hereafter that are part of or in communication with the tracking system 10 may communicate with each other in either wireless and/or wired fashions via a communication network 18 using any appropriate communication protocols. For example, standards for Internet and other packet switched network transmission (e.g., TCP/IP, UDP/IP, HTML, HTTP) represent standard examples of the state of the art in communication protocols. Such standards are periodically superseded by faster or more efficient equivalents having essentially the same functions. Accordingly, replacement standards and protocols having the same or similar functions as those disclosed herein are considered equivalents thereof.

The data store 12 represents a working area for data transfers between components of the tracking system 10. The data store 12 includes at least one processor to process and store data provided or transmitted by the other modules of the tracking system 10, and externalizes back stored data. A record of each operation flow or activity tracked by the tracking/mapping module 11 or completed during a forecasting or simulation session by the forecasting module 15 may be stored in the data store 12, thereby providing a complete audit trail of all operation activities tracked or performed during forecasting/simulation sessions.

The event data store 12a represents a working area for data storage and transfers during tracking and forecasting and simulation sessions. This event data store 12a can be a relational database, which passes to and receives data from the tracking module 11, the location module 13, the time module 14, the forecasting module 15 and other components of the tracking system 10. Alternately, the event data store 12a may reside independently of the data store 12, while remaining coupled to each other.

With regard to a user presentation, the tracking system 10 includes a user interface 19 to display and manage data by utilizing the virtual camera 16 as well as display static and dynamic views of the operation, and control forecasting/simulation sessions. The user interface 19 is in communication with the location module 13 to select and view tracking sessions, and to the data store 12 to upload and update operational data. The user interface 19 may also initiate, pause and terminate forecasting and/or simulation sessions performed on the forecasting module 15 as well as historical and statistical analyses performed on the history log and statistical module 17.

The user interface 19 can reside on or be connected to desktop and portable PC options 20, thin clients 21 via web servers, portable devices 22 and the like via wireless networks such as a local area network (LAN) 18 or the like. Further, the user interface 19 may include a video display unit, such as a liquid crystal display (LCD), an organic light emitting diode (OLED), a flat panel display, a solid state display, or a cathode ray tube (CRT). Additionally, the user interface 19 may include an input device, such as a keyboard, and a cursor control device, such as a mouse.

The tracking system 10 may be incorporated or implemented in any computer system that may operate as a stand alone computing device or may be connected, e.g., using a network, to other computer systems or peripheral devices. In a networked deployment, the computer system may operate in the capacity of a server or as a client user computer in a server-client user network environment, or as a peer computer system in a peer-to-peer (or distributed) network environment.

As such, the tracking system 10 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the tracking system 10 can be implemented using electronic devices that provide voice, video or data communication. Further, the term "system" shall also be taken to include any collection of systems or sub-systems systems that individually or jointly execute a set, or multiple sets, of instructions to perform one or more computer functions.

In addition, the tracking module 11, the data store 12, the location module 13, the forecasting module 15, the virtual camera 16 and the log and statistical analysis module 17 may each include a processor, a main memory and a static memory that may communicate via a corresponding communication bus.

Returning to FIG. 1, the data store 12 is in communication with a communication network or hub 23 which is in turn in communication with a plurality of tag sensors or readers 24. Each of the plurality of readers 24 has one or more antennas 24a. Typically, the RFID reader 24 is an electronic device that is used to interrogate an RFID tag 25. As commonly known, the readers 24 and the tags 25 both have their own antenna structure by which to send and receive information broadcast by radio wave transmissions. The RFID reader 24 uses the antenna 24a to emit radio waves and the RFID tag 25 responds by sending back its stored data.

Upon activation, the RFID reader 24 develops a read field or range which can be thought of as the three-dimensional space around it that contains sufficient energy to activate and read a passive tag. These read fields have available energy that is attracted to the antenna of the RFID tag 25. Once a threshold level of energy is surpassed, the tag 25 is triggered to release a burst of energy by itself or signal that contains its information. This response energy or signal is detected by the antenna 24a of the reader 24, and channeled to a host computer for processing.

As such, the RFID readers 24 are configured to detect the RF signal emitted by the RFID tag 25 when the emitted signal is within the range of the reader's RF field or read range, and the readers 24 receive and process the RF signals emitted by the tag 25. Thus, the readers 24 detect the presence of tags 25 by sensing their corresponding RF signals, and communicate the information contained or coded into these signals to tracking module 11, the data store 12 and/or to the location module 13 for processing so as to accurately determine the unique identification of and respective location of the tags 25. These signals include time stamps provided by clocks internal to the tags 25. These tag clocks are synchronized with the internal clocks of the readers on a predetermined or dynamic schedule, in order to improve the accuracy of the signal timestamps and minimize noise. The tag 25 may be an active tag with an internal power source and emit a constant RF signal (or alternatively pulsed beacon) or a passive tag that uses the energy of the detected field or signal to emit the RF signal or beacon.

In the tracking system 10, the plurality of tags 25 are associated with a plurality of entities 26 to be tracked. That is, each of the plurality of entities 26 can be identified via a corresponding RFID tag 25. During a tracking session, the processor of the data store 12 encodes and decodes the broadcast information, as well as stores the data and converts it into usable information. As such, the data store 12 collects data about the operation and about the activities of the plurality of entities 25 via the network 23. Each of the tags 25 may also be configured to transmit/emit status data related to the corresponding tagged entity 26 at predetermined times or at each status change of the corresponding entity 26 during a flow of the operation. The RFID readers 24 are configured to acquire and convey or communicate the captured tag data via the communication network 23 to the tracking module 11, the data store 12, the location module 13, and the time module 14. The tracking data is stamped by corresponding time stamps by the time module as it is communicated from the network 23 to the tracking module 11, the data store 12, and the location module 13. The virtual camera 16 in conjunction with the user interface 19 is configured to provide the visual and graphical displays of the operation to a user.

In regard to the location module 13, based on the entities 26 being tracked a programmed method performed on a processor may identify additional tracking tags 25 associated with alternate entities that may operate relatively together and generate a log for such event. As an example, if a tagged person (not shown) is scheduled or requested to move a tagged entity 24 from location A to location B, and the location module 11 identifies or determines that the person is within close proximity of the entity 26 during a movement or activity of the tagged entity 26, then the location module 13 may associate the tagged person with the tracked entity 26 from a tracking and logging perspective.

In addition, as both the tagged person and entity 26 move together, the location module 13 may determine that the tagged person has moved the entity 26 between the 2 locations between corresponding time stamps provided by the time module 14. The tracking results can subsequently be used for analysis purposes and as inputs into the forecasting module 15 and the historical and statistical module 17. For historical and statistical purposes, the historical and statistical module 17 may be used as an information module that analyzes a performance of the tracked entities 26, both chronologically and spatially. In addition to the historical analysis, statistical data may be generated to help identify specific performances for each entity 26, individually as well as relatively to other tagged entities 26, duration or cycle of each entity 26 in the operation, and every parameter associated with each entity 26 that is stored in the data store 12.

Figure 2:
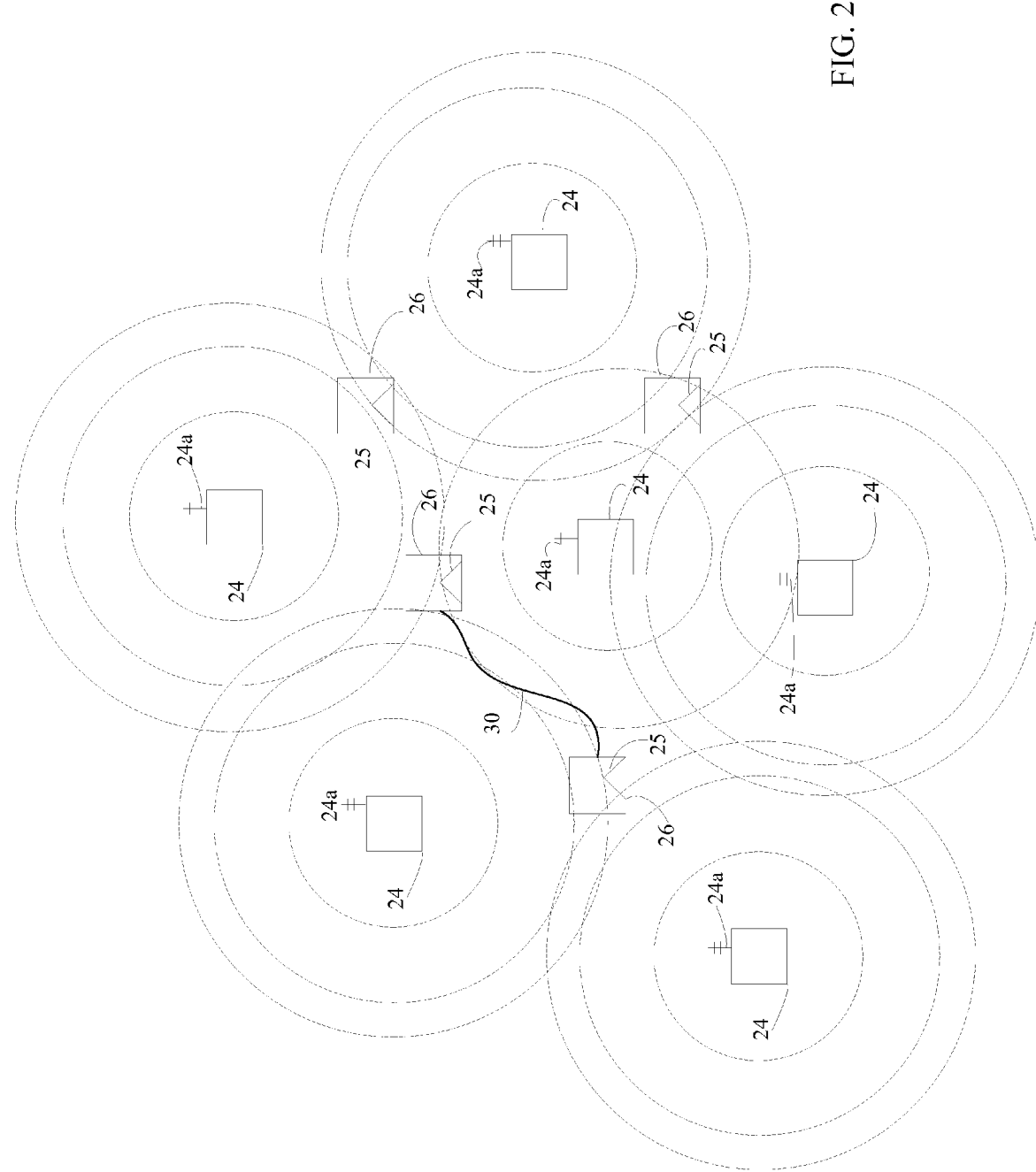
FIG. 2 is a schematic diagram illustrating positions of tagged entities in relation to locations of readers in accordance with the invention.

Now referring to FIG. 2, a schematic diagram 200 illustrating positions of tags 25 associated with corresponding tagged entities 26 in relation to receiver units or readers 24 is shown. The readers 24 may be associated with processing stations or cells of the operation. Alternately, the readers 24 may be positioned at selected or predetermined locations so as to optimize a monitoring of the tagged entities 26.

As stated above, the location module 13 can implement or utilize the proximity of each tag 25 to the readers 24 and/or an actual of position of each tag 25 based on a coordinate system which may be used to pinpoint the location of the tagged entity 26 within the operation. Both implementations rely on data received by the reader 24 and are based on timestamp inputs, and other factors that can be used to identify a proximity or radius to the tag 25, such as signal intensities or levels. Multiple signals corresponding to each of the readers 210 are analyzed to evaluate and determine respective distances between the tagged entity 26 and each of the readers 24 in order to substantially identify or determine the location of the tagged entity 26.

Each of the plurality of readers 24 is provided with a corresponding graphical location on a map of the operation. The map of the operation can be retrieved from the data store 12 and be displayed in 2D and 3D views via the virtual camera 16 on the user interface 19. The map can be a geographical and structural/architectural representation of the layout of the operation and its environment. The virtual map generated by the virtual camera 16 can display one or more desired portions of the map of the operation, one or more graphical structural elements, as well as one more entities and their corresponding status summaries. The virtual camera 16 can also display one or more versions of the map illustrating alternate flows of the operation. The virtual camera 16 may run as a thin client over the web or in hand held devices.

Each reader 24 is assigned a fixed x, y, z coordinate value set. In the case where the operational map includes multiple floors or the environment covers multiple floors, the reader 24 may be given an additional coordinate that may represent a floor number for a more accurate location determination. As each one of the tags 25 is configured to emit a beacon signal either at regular intervals and/or at the request of the readers 24 or other devices, or based on an action impacting the tagged entity 26 such as a pressed button, IR signal or the like. The reader 24 senses and communicates to the monitoring software of the tracking/mapping module 11 the unique identification of the tag 25 as well as the intensity of the corresponding received signal, in addition to any other tracked information including time between emissions of signals.

The tracking/mapping module 11, which includes a processor (not shown), continuously monitors the signals being received or to be received from the tags 25 by each reader 24 and updates the data store 12 and the location module 13. The location module 13 examines the information received about the tags 25 from each reader 24 and determines a distance/radius of each tag 25 to each reader 24 based on these received signals and their corresponding power levels. Since multiple readers 24 may provide information based on the multitude of received signals corresponding to each of the plurality of tags 25, the location module 13 is configured to:
  a. collect all activities reported for each tagged entity 26 from all readers 24;
  b. collect the distance of each tag 25 from each of the readers 24;
  c. disregard any data that does not fit the reported profile or identifies it as noise data;
  d. determine the actual location of each tag 25 by intersecting all spheres centered at the identified readers 24 and having radiuses equivalent to the corresponding collected distances, by using a triangulation technique, for example; and
  e. determine correlations between entities 26, if any.

The current or latest location of each tag 26 is then identified with a corresponding X, Y, Z coordinate set and a floor, sub-floor, shelf and/or stack location, if applicable. The Z positional coordinate may also be used to verify the floor location, and to identify the elevation position of each tag 25. The X, Y, Z coordinate set is then mapped on the displayed map based on the dimensions of the corresponding tagged entity 26 being tracked and the location of the tag 25. The resulting location data is displayed to scale on the virtual map.

The location module 13 may publish data related to the determined location of the tag 25 to the data store 12 which may in turn communicate this location data to the virtual camera module 16, which utilizes graphical display software to provide dynamically views of the location of the corresponding tracked entity 26. As stated above, the virtual camera module 16 is used to map the position of the tag 25 based on the dimensions of the corresponding tagged entity 26. The tagged entity 26 may also be virtually displayed on the virtual map based on its dimensions. When the tagged entity 26 starts moving, its tag location will be changed or updated by the location module 13 and provided to the virtual camera 16. The virtual camera module 16 may also add all in-between frames to display a substantially continuous motion of the tagged entity 26, as illustrated by continuous line 30 shown in FIG.2.

All displayed data, including added in-between frame data, may be also communicated by the virtual camera module 16 to the data store 12 for storage and future reference or replay. At any point, the virtual camera module 16 may replay the movements of any tracked entities 26 or a specific set of tracked entities 26 based on their historical data.

The location module 13 may also be configured to monitor the data store and establishes relationships between the tracked entities 26 based on their respective locations and movements. As multiple entities 26 may move together within the same activity constraints and dimensions, the location module 13 may determine that these entities 26 are moving with some relation to each other and insert a corresponding "collaboration" or "correlation" field in the data store 12. As an example, if both a car and a person are tagged and tracked and the tracked location of the tagged person is within the dimensions of the tagged car, then the location module 13 may determine that the person has entered or is inside the car. In addition, as both corresponding tags 25 start moving, the location module 13 may determine that the tagged person is driving the tagged car. Similar logic can be determined and applied in other environments, such as student monitoring in a pre-school environment so as to monitor and track an interaction between children and their teachers. Via the user interface 19, the user may initiate a request to retrieve locations of individual tags 25 from the data store 12 and/or the location module 13 and have them represented graphically via the virtual camera 16, or to search graphically for a specific tagged entity 26 based on the entity properties.

The tracking information generated is used to create a detailed history of all tracked entities 26 and the relationship between them, if any. The tracking data may be used to forecast the future of the operation, to generate dynamically a process map, a value stream map, a value network map, or additional analysis that can be used to improve the overall efficiency of the operation. Thus, tracking data may be used to perform predictability and forecasting analysis on the operation to show the future state of the operation and how it might progress through time. Each tracked entity or set of entities 26 can be queried for position, history, and statistical data during the tracking session. Thus, as the tracking/mapping module 11 feeds dynamically all run data stamped by the time module 14 to the user interface 19, the tracking operation can be displayed or animated in real time via the virtual camera 16 with substantially exact mapping of the tracked entity 26. The tracking data can be stored for later retrieval/replay of the operation.

Functionally, the location module 13 captures all the process rules and data related to the tracked operation. Moreover, any rule or data changes made via the user interface 19, the data store 12 or external interfaces (Legacy Host) 27 are automatically captured and dynamically implemented by the location module 13 during the tracking session. The data store supports global process activities inclusive of accessing data, and managing that data for access by other individual modules or applications. Functionally, the tracking/mapping module 11 is triggered to begin the tracking session, and the location module 13 caches all the rules of the operation upon startup of the tracking session or upon a first execution of the operation and represent the life of the operation.

With regard to the user presentation, the virtual camera 16 enables views of the operation in a substantially continuous loop by continuously loading information about the tagged entities 26 from their corresponding tagging devices 25 via readers 24 and the communication network 23 and displaying the information in real time to the user. As stated above, the virtual camera 16 can display each entity 26 to scale based on the entity dimensions and on the relative dimensions to other displayed entities 26. The dimensions of each entity 26 can be retrieved from the data store 12 from on a set of parameters stored or entered ahead of time. Alternately, the dimensions of each entity 26 can be entered via the user interface 19 when the entity tracking starts or any time during the tracking session. Since the entity 26 can also identify or represent a person, the virtual camera 16 may display the location of the person with respect to that corresponding entity 26. As such, each tracked entity 26 can have a different screen representation based on its identification and properties. Additionally, a screen representation of each entity 26 can be an image or a data segment identifying that entity 26 separately.

Based on a log generated by the history logging module 17, the virtual camera 16 may also display a history of every entity 26 being tracked, that includes but not limited to:
  a. a timeline for the entity 26 through its lifetime in the operation;
  b. any other entity 26 that interacted with it and the duration of the interaction; and
  c. the number of times and chronological view of specific operations performed.

In regard to the forecasting module 15, the tracking data may be used in conjunction with historical data and/or operation information to identify potential problems based on future activities or operation scenarios that can be performed. A forecasting session may be started based on stored data of the operation or on a current snapshot of the operation. The forecasting module 15 may then continuously monitor the simulated progress or flow of the operation and tracks the involved tagged entities 24 to determine potential operation problems that may develop based on:
  current operation constraints and historical activities of each entity 26;
  changes in operation constraints;
  additional entities 26 that are planned to be activated or processed; and
  additional entities 26 planned to be processed along with expected variations in the flow constraints.

The forecasting module 15 may also generate analysis information and dynamic notification in case a potential problem is detected or forecasted. The dynamic notification can be provided in electronic form (email, SMS, document . . . ) or communication through paging/calling the person/user or group in charge. The current state of the operation is saved along with the generated analysis information so that the user can devise and evaluate appropriate solutions to resolve or mitigate current and potential future problems based on applicable constraints. The forecasting module 15 may also optimize the operation in order to avoid and/or work around current or potential problems. The analysis of the operation may also utilize value stream mapping and value network mapping in addition to routing analysis, resource analysis, among others.

The forecasting module 15 may enable the user or an organization to identify accurate delivery times for produced/processed entities 26 based on the current load and constraints of the operation. As an example, a sales person may identify a substantially exact delivery time to a client by inputting the order into the operation being tracked by the tracking system 10, which may then forecast a substantially accurate delivery/shipping time based on the order augmented state of the operation.

In regard to predicting future flows or alternate scenarios of the operation, the forecasting module 15 via the tracking/mapping module 11, the location module 13 and the data store 12 captures all the process rules and data related to the flow of the operation when the forecasting session is initiated. Moreover, any rule or data changes made via the user interface 19, data store 12 or external interfaces (Legacy Host) 27 are automatically captured and dynamically implemented by the forecasting module 15 during the forecasting session. Once the forecasting session is stopped or cancelled, the forecasting module 15 may not need to be aware of the on-going tracked operation until another forecasting session trigger occurs. The forecasting session may be triggered by the user, forecasted events, predetermined schedules or by any other module of the tracking system 10. The forecasting module 15 performs operational steps associated with the operation until it encounters an operational task or another trigger that requests the operation to pause, terminate or resume with altered processing rules. These rules include parameters or variables associated with tagged entities 26, and stations/cells or users (not shown) that process or interact with these tagged entities 26, the interrelationships between these stations that may define activities within the operation, and interrelationships between the tagged entities 26.

In manufacturing, production, business or office systems, entities 26, that may be workpieces or people, flow through stations that may be separated by transportation transitions (carriers or paths) or storage spaces for temporary storage, referred to herein as buffers. Each station comprises one or more operational tasks, such as a robotically or computer generated task, or a task performed by the user, personnel or client, such as driving, assembly or machining. Buffers can be either parallel or crossover. Since each station has its own cycle time, frequency of machine breakdown, and time required to repair, and each buffer has its own capacity, the flow of the operation can be interrupted, starved, or blocked by any mismatches between stations.

One problem is to improve a performance of such an operation, but this performance is governed by a combination of interrelations between tagged entities 26, stations and buffers, which are characterized by their corresponding rules and parameters. Modifying one station or one buffer without considering the existing interrelationship to the other stations or buffers may lead to minimum or no improvement in performance. Thus, the targeted solution lies in finding a dynamic approach to determine a combination of station and buffer parameters under which the operation meets a desired performance. Some of these parameters are, of course, more controllable than others. So the degree of design freedom of the operation may be limited and constraints may exist even on the controllable parameters.

As such, a thorough understanding of future or alternate behaviors of the operation can be acquired by creating an accurate operation model using known and predictable data for the tagged entities 26, the users, the stations, and the buffers. A forecasting or simulation session of the operation model provides an operation or process map, which is generically a hierarchical procedure for displaying and illustrating how the tagged entities 26 are processed. Generally, the process map comprises a stream of station activities that process the entities 26, and provides an understanding of the interaction of activities and causes during the process flow of the operation. Thus, a dynamic operation map may be used to determine a combination of parameters under which the process flow of the operation is modified during the forecasting session to reach the targeted or optimum performance.

Given a manufacturing, production, business or office operation, and using the user interface 19 and the location module 13, among others, a model of the operation is initially built or configured with stored data of tagged entities 26, stations, buffers, and other related resources based on a determined initial or current state of the operation. The respective locations of the stations and buffers in the operation model may substantially determine potential paths or routes of the tagged entities 26 through the operation. Alternately, the operation model may be automatically built and configured based on routing tables or other flow definition methods. The routing tables may be accessed or retrieved from the data store 12 or from external applications 27. Thus, the building or configuration of the operation model may be executed or performed without any software coding created internally by location module 13 or externally by the user. Once configured, the operation model is loaded to the data store 12 as the default model for the operation.

To simulate the process flow of the operation, the forecasting module 15 may be triggered via the user interface 19. Subsequently, the forecasting module 15 acquires or caches all the rules and data related to the process flow of the operation from the data store 12 and other contributing modules. During the forecasting session, the forecasting module 15 provides run time data to the user interface 19 to display dynamically via the virtual camera 16 the resulting operation map, as well as to the other modules, such as the event data store 12 and the location module 13. Accordingly, the virtual camera 16 may enable an animation of the simulated operation map and display custom and simulation properties of the entities 24, and resources dynamically during and after the end of the forecasting session.

During this forecasting session, the user may wish to determine an improvement to the operation flow to mitigate a problem with one or several of the entities 26, stations or buffers, for example, or to play "what if" scenarios. Based on the dynamic display of the operation map or on report, the user may identify productivity parameters that correspond to the problem or the "what if" scenario. The user may then modify at least one of the identified parameters on the fly while the forecasting session progresses. Such parameter modification is recognized dynamically by the forecasting module 15, and the modified parameters are incorporated in the event data store 12 for the remainder of the forecasting session or until the next parameter modification. The dynamic incorporation of the modified parameters enable the forecasting module 15 to provide a corresponding dynamic operation map to be evaluated and analyzed by the user. Every modification or change of the operation model, such as parameter or resource modifications, is captured as a departure from the current version of the operation model, and the forecasting module 15 dynamically designates or uses the new version of the operation model to produce dynamically a corresponding operation map. As such, the forecasting module 15 can track and record a history of changes done to the operation model.

Further, as departures from the current version of the operation model are stored and used to produce corresponding operation maps, the forecasting module 15 can simulate, and analyze multiple scenarios simultaneously. Additionally, the forecasting module 15 can be configured to modify the current forecasting session in order to mitigate a forecasting-session violation of limits or thresholds imposed on the parameters, for example, or to improve and optimize the operation performance. The forecasting module 15 can further dynamically change routing, selection, cycle times, and all other constraints and properties during the forecasting session based on predetermined conditions, scenarios related to scheduling of resources, and so forth.

The operation improvements may relate to mitigating a bottleneck, a delay, a scheduling problem, or reducing operating costs. The operation improvements may also correspond to new routings of the operation flow, cycle times of each of the plurality of stations, input resources, and output requirements of the operation.

In regard to routing of the process flow of the operation, the forecasting module 15 can also import or load external routing tables from external applications 27 dynamically and update the routing of entities 26, and resources based on the imported routing table. The imported routing table can further be changed dynamically during the forecasting session by the user or by external applications 27. The modified routing can be reloaded or re-synchronized with the operation model with direct impact on the on-going forecasting session. Moreover, the forecasting module 15 can dynamically interface with external applications 27 and export or import data at any time during the forecasting session. In addition to imported routing tables, the imported data can represent modified entities 26, parameters, new stations, and so forth.

In addition to the flow of the operation, a dynamic value stream encompasses all the steps (both value added and non-value added) in the operation that helps bring the tagged entities 24 through the operation. The dynamic value stream map is typically configured to gather and display a broad range of information, and is used at a broad level, i.e. from the receiving of raw material to the delivery of finished products. The dynamic value stream map may be used to identify where to focus future projects, subprojects, and/or Kaizan events. Thus, the dynamic value stream map takes into account not only the activity or journey of the entities 26, but also the management and information systems that support the operation. These characteristics of the value stream map are substantially helpful to gain insight into potential efficiency improvements in addition to the operation, thereby helpful when aiming to reduce station cycle time for example.

As discussed above in regard to the operation mapping and using the forecasting module 15, the model of the operation is initially built or configured with data of entities 26, stations, buffers, resources, and parameters or variables such as value stream metrics corresponding to the stations and to interrelationships between the stations. The value stream metrics can represent value added time (VAT), non-VAT, efficiency, take time, entities processed, entities in progress, capacity, downtime, set-up and change over, load time, unload time, buffer size, lead time, and so forth.

To create a dynamic value stream map, the forecasting module 15 is triggered via the user interface 19 or by external events. At the start or during this forecasting or simulation session, the user may wish to identify or select all or a subset of the available value stream metrics that correspond to the entities 26, stations and to interrelationships between the entities 26 and the stations. During the simulation of the value stream map, the selected value stream metrics are evaluated and dynamically updated, thereby creating the dynamic value stream mapping.

Moreover, in order to analyze and evaluate the value stream when subjected to any applicable conditions and "what if" scenarios, the user may identify a set of corresponding value stream metrics. The user or external applications 27 may then modify at least one of the corresponding value stream metrics on the fly while the simulation session progresses. Such value stream metric modification is recognized dynamically by the forecasting module 15, and the modified value stream metrics are incorporated in the event data store 12 for the remainder of the simulation or until the next value metric modification. Every modification or change of the value stream metrics is captured as a departure from the current version of the value stream, and the forecasting module 15 dynamically designates or uses the new version of the value stream to create dynamically a corresponding value stream map. As such, the forecasting module 15 can track and record a history of states of the value stream maps.

Further, as different versions, departures from the current version, of the value stream are stored and used to produce corresponding value stream maps, and the forecasting module 15 can simulate simultaneously these different value stream maps. Due the dynamic importation and exportation of data, routing tables and value stream metrics of stations, for example, prior to or during the forecasting session, the value stream map may be useful to predict or forecast future value stream maps. Such imported value stream metrics may correspond to work in progress (WIP) or forecasted data. The simulated value stream map may dynamically detect future potential bottlenecks, delays, and scheduling problems. This dynamic value stream map can validate change within the Lean constraints. Further, based on the interaction between the value stream maps, minimum requirements may be set for the Six Sigma initiatives.

After starting or triggering the forecasting session, all activities of the operation are generated by the forecasting module 15 and provided dynamically to the virtual camera 16. These activities correspond to the behavior or progress of the entities 26, stations, buffers, as well as data, during the forecasting session. As such, the forecasting module 15 can generate and provide via the virtual camera 16 a path for every entity 26 during the forecasting session and identify lean values (non-value added time, value added time, transition time, processing time, and others) per entity 26, and path, among others.

Since the forecasting module 15 is in communication with the event data store 12 during the forecasting session, the user can request a display in real time of any statistical data relating to the operation, including entities 24, stations and so forth, as well as a graph of any tracked statistical data as it changes through time during and after the forecasting session completes. The user can also request analysis reports from the history log and analysis module 17 detailing potential forecasting problems based on the predetermined constraints. The reports, statistical and informational, may be customized by the user, and generated during or after the forecasting session to be used as guides to help improve and optimize the operation.

In support of the dynamic process and value stream maps discussed above, the user can graphically modify the operation model during the forecasting session, and make changes to the routing of the operation, cycle times, resource requirements, and all other constraints and properties of the operation model. The user can trigger a pause to the forecasting session, and then resume it without any resetting or loss of the data. Moreover, the user can initiate the data collection and analysis to be reset as many times as needed during the forecasting session while maintaining the operation behavior and entities positions.

During this forecasting session, and using the dynamic display of the operation map, the user may identify productivity parameters that correspond to an operation problem or to "what if" scenarios. The user may then recall or highlight to modify at least one of the identified parameters on the fly while the forecasting session progresses. Such parameter modification is recognized dynamically by the forecasting module 15, and the modified parameters are incorporated in the event data store 12 for the remainder of the forecasting session. Since every modification or change of the operation model is captured as a departure from the current version of the operation model, the user may opt to simultaneously simulate more that one dynamic operation map, and display them simultaneously via the virtual camera 16. As such, the user can run several versions or scenarios of the operation for educational and analytical comparisons. Similarly, the user can create dynamic value stream maps of the operation by dynamically modifying or altering targeted value stream metrics.

Moreover, dynamic process and value stream maps are configured to exchange data during the forecasting session. Accordingly, the user may benefit from creating a dynamic process map to view and analyze the resulting impact on the corresponding value stream map. Vice-versa, by creating a dynamic value stream map, the user can view and analyze the resulting impact on the dynamic process map.

As stated above, the dynamic value stream map may provide real information about entities 26 progressing through the operation, and take into consideration the product mix that may be in production at different times at individual stations of the operation. In a low product mix environment, with a relatively small number of entities 26, the dynamic value streams may be evaluated or computed for each of the entities 24 progressing though the operation. In a relatively high mix environment, such as a custom job shop for example, the dynamic value streams may change based on the current entity mix. In such high mix environment of multiple entities 26, the interaction between corresponding dynamic value streams may be substantially helpful in determining problems, such as bottlenecks and constraints, which are reflected in the operation flow map. This interaction between multiple entity dynamic value streams may be highlighted by a dynamic value network map.

This dynamic value network map may be configured to display multiple dynamic value streams that correspond to a set of selected or determined entities 26. As such, for each station of the operation, the dynamic value network map may provide dynamic value streams of selected metrics of any predetermined subset of the products currently being processed at that station. Thus, the dynamic value network map may display dynamically and simultaneously each selected value stream metric of each selected individual product at each station of the operation, thereby providing a dynamic targeted view or display of the current operation.

To create the dynamic value network map, the forecasting module 15 is triggered via the user interface 19 or by external events. At the start or during this forecasting session, the user may wish to identify or select all or a subset of the available value stream metrics that correspond to the entities 26 being processed at each station of the operation and to interrelationships between these entities 26. During the forecasting session, the selected value stream metrics are evaluated and dynamically updated, thereby creating the dynamic value network map.

Moreover, in order to analyze and evaluate the network value maps when subjected to any applicable conditions and "what if" scenarios, the user may identify a set of corresponding value stream metrics. The user or external applications 27 may then modify at least one of the corresponding value stream metrics on the fly while the forecasting session progresses. Such value stream metric modification is recognized dynamically by the forecasting module 15, and the modified value stream metrics are incorporated in the data store 12 for the remainder of the current forecasting session or until the next value metrics modification. Alternately, the user may opt to modify a predetermined number of value stream metrics to simulate corresponding dynamic value network maps. These simulated corresponding dynamic value network maps may be used for comparison purposes of alternate current and future states of the operation. Every modification or change of the value stream metrics is captured as a departure from the current version of the network value map, and the forecasting module 15 dynamically designates or uses the new version of the value streams to create dynamically a corresponding value network map. As such, the forecasting module 15 can track and record a history of states of the value network maps.

Further, as different versions, departures from the current version, of the value streams are stored and used to produce corresponding value network maps, and the forecasting module 13 can run simultaneously these different value network maps.

As stated above, each entity 26 or each part of the entity 26 progressing through the operation generates corresponding paths or a corresponding route that connects the corresponding processing stations, including the corresponding input and output stations. All of the generated paths may be combined or overlaid to provide all potential object routes taken by the processed entities 26 progressing through the operation. Accordingly, a subset of all generated paths may be more active than other paths during the operation.

For an improved understanding of the activities of the generated paths, an entity or object routing map may be provided. This object routing map may provide an operation view that displays or highlights the most active paths of the operation. This object routing map may be useful in detecting substantially active routing paths, i.e. high traffic paths.

Moreover, future and current object routing maps of the operation may be compared so as to investigate and/or determine a potential routing improvement that may reduce the activities of heavily trafficked paths. Such potential routing improvement may be achieved by sharing operational activities of stations, located along the heavily trafficked paths, with alternate or additional strategically placed stations. Such production sharing of the involved stations may reduce bottlenecks and travel times of at least the entities 26 progressing through the problematically active paths of the process flow.

It is therefore intended that the foregoing detailed description be regarded as illustrative rather than limiting, and that it be understood that it is the following claims, including all equivalents, that are intended to define the spirit and scope of this invention.

What is claimed:

1. A method for dynamically tracking a plurality of entities progressing through an operation each having an electronic tagging device associated therewith, said method comprising:
    sensing signals emitted by each of the plurality of tagging devices, at predetermined instances or when triggered by external events, by a plurality of sensors located at predetermined sites with respect to the operation, each signal including information uniquely identifying the corresponding tagging device;
    communicating the sensed signals and corresponding energy levels at which they were sensed by each of the plurality of sensors to a data processor;
    processing the unique identification information provided by the signals and their energy levels to determine a location of each tagging device relatively to the predetermined sites of the sensors;
    dynamically updating a path of each tagging device and the associated entity based on the determined location with respect to at least a portion of the operation;
    determining that a first of the plurality of tagging devices and a second one of the plurality of tagging devices are progressing in close proximity to each other through the operation, when a distance between the dynamically updated paths of each of the first and second tagging devices remains smaller than a predetermined physical dimension during a segment of time; and
    determining whether the first tagging device and the second tagging device are correlated to one another based on corresponding unique identification information, and utilizing the determined correlation to improve a forecast of a flow of the operation; and synchronizing internal clocks of the tagging devices with internal clocks of the sensors to improve the accuracy of the signal timestamps and minimize noise; and time-stamping the emitted signals via the internal clocks internal of the tagging devices.

2. The method for dynamically tracking a plurality of entities as in claim 1, wherein determining the location of each tagging device relatively to the predetermined sites of the sensors comprises:
    performing a triangulation computation by intersecting at least three spheres centered at corresponding sensors and having each a radius distancing the tagging device to one of the sensors.

3. The method for dynamically tracking plurality of entities as in claim 2, further comprising:
    determining an elevation of the location of each tagging device based on results of the triangulation computation.

4. The method for dynamically tracking plurality of entities as in claim 3, wherein the determined elevation of the location of each tagging device corresponds to a floor, a sub-floor, a stack or a shelve on the stack associated with a structure utilized in the operation.

5. The method for dynamically tracking a plurality of entities as in claim 1, further comprising:
    dynamically connecting consecutively determined locations of the plurality of entities on a displayed map thereby displaying paths taken by the plurality of entities during the operation as continuous lines.

6. The method for dynamically tracking a plurality of entities as in claim 1, further comprising:
    storing all data indicative of properties of the plurality of tagged entities and of their historical progress through the operation; and
    replaying the historical progress of any individual entity or of a select subset of the plurality of entities.

7. The method for dynamically tracking a plurality of entities as in claim 6, further comprising:
    performing a statistical analysis using stored data to evaluate a performance of the operation.

8. The method for dynamically tracking a plurality of entities as in claim 6, further comprising:
    performing a historical analysis using stored data to analyze problems or issues encountered during the recorded life of the operation.

9. The method for dynamically tracking a plurality of entities as in claim 6, further comprising:
    retrieving stored properties, constraints, and historical data corresponding to both the plurality of entities and the operation; and
    simulating a flow of the operation based the retrieved stored data to forecast a behavior of each of the plurality of entities through the operation and of the operation.

10. The method for dynamically tracking a plurality of entities as in claim 9, further comprising:
    storing dynamically data collected during the simulation; and
    analyzing the simulation data to determine problems related to the flow of the operation and to the behavior of each of the plurality of entities during the simulation.

11. The method for dynamically tracking a plurality of entities as in claim 10, further comprising:

determining at least one modification to the properties and constraints to mitigate at least one of the problems determined during the simulation of the flow of the operation.

12. The method for dynamically tracking a plurality of entities as in claim 10, further comprising:

determining at least one modification to the properties and constraints to optimize the flow of the operation.

13. A method for dynamically tracking a plurality of entities progressing through an operation each having an electronic tagging device associated therewith, the operation having a plurality of processing stations configured to process the plurality of tagged entities, and each of the stations and each of the plurality of entities is attributed a corresponding set of value stream metrics, said method comprising:

sensing signals emitted by each of the plurality of tagging devices, at predetermined instances or when triggered by external events, by a plurality of sensors located at predetermined sites with respect to the operation, each signal including information uniquely identifying the corresponding tagging device;

communicating the sensed signals and corresponding energy levels at which they were sensed by each of the plurality of sensors to a data processor;

processing the unique identification information provided by the signals and their energy levels to determine a location of each tagging device relatively to the predetermined sites of the sensors;

dynamically updating a path of each tagging device and the associated entity based on the determined location with respect to at least a portion of the operation; and determining that one of the plurality of entities is progressing through the operation within physical dimensions of another one of the plurality of entities, which is also progressing through the operation, when a distance between the tracked locations of the two entities remains smaller than one of the physical dimensions of the another one of the plurality of the entities;

dynamically updating the value stream metrics to provide a dynamic value stream map of the operation.

14. The method for dynamically tracking a plurality of entities as in claim 13, further comprising:

forecasting the dynamic value stream map based on collected data.

15. The method for dynamically tracking a plurality of entities as in claim 13, further comprising:

dynamically displaying multiple dynamic stream values at selected stations to provide a dynamic value network map.

16. A computer system comprising one or more computers configured to perform the method of claim 1.

* * * * *